(12) United States Patent
Hong et al.

(10) Patent No.: US 11,309,762 B2
(45) Date of Patent: Apr. 19, 2022

(54) MOTOR

(71) Applicant: LG Electronics Inc., Seoul (KR)

(72) Inventors: Jin Hong, Seoul (KR); Yongdae Kim, Seoul (KR); Kwangyong Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 95 days.

(21) Appl. No.: 16/815,704

(22) Filed: Mar. 11, 2020

(65) Prior Publication Data

US 2021/0028663 A1 Jan. 28, 2021

(30) Foreign Application Priority Data

Jul. 25, 2019 (KR) .................. 10-2019-0090073

(51) Int. Cl.
*H02K 3/34* (2006.01)
*H02K 3/18* (2006.01)
*H02K 1/14* (2006.01)
*H02K 3/32* (2006.01)

(52) U.S. Cl.
CPC ............. *H02K 3/345* (2013.01); *H02K 1/146* (2013.01); *H02K 3/18* (2013.01); *H02K 3/325* (2013.01); *H02K 3/34* (2013.01)

(58) Field of Classification Search
CPC .......... H02K 3/345; H02K 3/18; H02K 1/146; H02K 3/325; H02K 3/522; H02K 2203/12; H02K 3/38; H02K 5/225; H02K 1/04; H02K 3/34; H02K 3/46; H02K 1/148;

(Continued)

(56) References Cited

U.S. PATENT DOCUMENTS

| 8,497,618 B2* | 7/2013 | Kato ...................... H02K 3/522 310/215 |
| 9,705,373 B2* | 7/2017 | Azusawa ............... H02K 3/345 |
| 9,887,601 B2 | 2/2018 | Mizoue |
| 2009/0127969 A1* | 5/2009 | Okuyama .............. H02K 3/522 310/215 |
| 2009/0243421 A1 | 10/2009 | Matsuura et al. |

(Continued)

FOREIGN PATENT DOCUMENTS

| CN | 203554084 | 4/2014 |
| CN | 106602773 | 4/2017 |

(Continued)

OTHER PUBLICATIONS

AU Office Action in Australian Appln. No. 2020200619, dated Nov. 30, 2020, 7 pages.

(Continued)

*Primary Examiner* — Quyen P Leung
*Assistant Examiner* — Alexander A Singh
(74) *Attorney, Agent, or Firm* — Fish & Richardson P.C.

(57) ABSTRACT

Various embodiments relate to a stator having an improved structure of an insulator coupled to teeth and to a motor having the stator. The stator includes an insulator. The insulator includes: a coil-wound portion surrounding an outer circumferential face of a tooth; and both side walls respectively extending from both sides of the coil-wound portion, wherein the both side walls and the coil-wound portion defines a space receiving the coil, wherein one of the both side walls includes a coupling portion, wherein the insulator are divided into two parts and the two parts are coupled to each other via the coupling portion such that the tooth is inserted into and coupled to the insulator.

20 Claims, 7 Drawing Sheets

(58) Field of Classification Search
CPC .. H02K 1/12; H02K 3/28; H02K 3/30; H02K 3/32
USPC .................................................. 310/214, 215
See application file for complete search history.

(56) References Cited

U.S. PATENT DOCUMENTS

| | | | | |
|---|---|---|---|---|
| 2013/0009512 A1* | 1/2013 | Tashiro | ................. | H02K 3/522 |
| | | | | 310/215 |
| 2013/0221770 A1 | 8/2013 | Yokogawa | | |
| 2014/0015349 A1* | 1/2014 | Chamberlin | ........... | H02K 3/345 |
| | | | | 310/43 |
| 2015/0137637 A1 | 5/2015 | Jang et al. | | |
| 2016/0072351 A1* | 3/2016 | Mizoue | ................. | H02K 3/522 |
| | | | | 310/71 |
| 2017/0005535 A1* | 1/2017 | Gervais | ................. | H02K 3/522 |
| 2018/0183290 A1* | 6/2018 | Wust | ....................... | H02K 3/522 |

FOREIGN PATENT DOCUMENTS

| | | |
|---|---|---|
| EP | 3176912 | 6/2017 |
| FR | 2995470 | 3/2014 |
| JP | 2007014088 | 1/2007 |
| JP | 2008301637 | 12/2008 |
| JP | 2010207027 | 9/2010 |
| JP | 2013005564 | 1/2013 |
| JP | 2013183466 | 9/2013 |
| JP | 2015080341 | 4/2015 |
| KR | 1020150057566 | 5/2015 |
| KR | 1020190069236 | 6/2019 |
| TW | 200803114 | 1/2008 |
| TW | 201006101 | 2/2010 |
| WO | WO2013080597 | 6/2013 |
| WO | WO2015162916 | 10/2015 |

OTHER PUBLICATIONS

KR Office Action in Korean Appln. No. 10-2019-0090073, dated Dec. 7, 2020, 17 pages (with English translation).
Extended European Search Report in European Application No. 20156856.5, dated Sep. 16, 2020, 7 pages.
TW Office Action in Taiwanese Appln. No. 109100977, dated Jan. 8, 2021, 2 pages (with English translation).

* cited by examiner

MOTOR

CROSS-REFERENCE TO RELATED APPLICATIONS

This application claims the benefit of Korean Patent Application No. 10-2019-0090073, filed on Jul. 25, 2019, which is hereby incorporated by reference as if fully set forth herein.

BACKGROUND OF THE INVENTION

Field of the Invention

Various embodiments of the present disclosure relate to a stator having an improved structure of an insulator coupled to teeth and to a motor having the stator.

Discussion of the Related Art

A general motor realizes a driving force via interaction between a stator and a rotor. Basically, structures of the stator and the rotor are the same.

However, types of the motors are divided based on a principle of rotation of the rotor due to the interaction between the stator and the rotor. In addition, the types of the motors may be divided based on a type or a phase of power applied to a stator coil. In addition, the types of the motors may be divided depending on a scheme for winding the stator coil. In an example, a variable voltage motor is of a direct current type, while a 3-phase induction motor is of an alternating current type.

A general structure of the motor includes a rotation shaft, a rotor coupled to the shaft, and a stator fixedly disposed inside a housing. Further, the stator surrounds the rotor and is spaced from the rotor by a predetermined spacing.

In addition, the stator has teeth to wind a coil therearound to generate a rotating magnetic field, thereby inducing electrical interaction between the rotor and the stator to induce rotation of the rotor.

A scheme for winding the coil may include a concentrated winding scheme and a distributed winding scheme. In the concentrated winding scheme, the coil is wound in one slot in a concentrated manner. Further, the distributed winding scheme, the coil is wound in at least two slots in a divided manner.

In the concentrated winding scheme, copper loss may be reduced via reducing a winding amount, compared to the distributed winding scheme. However, the coil is excessively concentrated in the slot, causing a large change in a magnetic flux density and increasing core loss (or iron loss), that is, power loss of the iron core. Thus, the concentrated winding scheme is generally used in a small motor.

Recently, motors used in various home appliances (such as hair dryers, cleaners, and the like) have been developed to overcome spatial restriction and improve an insulation performance due to demands of miniaturization and performance improvement.

In addition, an insulator that is typically coupled to the teeth is composed of two or more parts including an upper insulator and a lower insulator that are coupled to each other. The insulator having this configuration should surround the entire teeth tightly when combined thereto.

However, when the thickness of the insulator is made smaller in accordance with the trend of miniaturization and weight reduction of the motor as described above, the coupling force of the insulator is weak, so that it is difficult to surround the entire teeth. In this case, sufficient insulation may not be secured, which may adversely affect the performance of the motor.

Patent document 1 discloses an insulator composed of a single part in order to solve the problem that the insulator composed of the plurality of parts increases the manufacturing cost, and manufacturing time due to addition of the manufacturing and assembly process.

In Patent document 2, an insulator are divided into parts corresponding to a plurality of split cores and distal ends of the parts are coupled to each other in an overlapping manner using a coupling structure, in order to solve a problem that the number of manufacturing process increases and the process cost is increased when parts of the insulator are manufactured separately, and a process of combining the upper and lower insulator parts with each other is complicated.

Patent document 3 relates to a brushless motor as configured to prevent deformation of a coil pattern when winding the coil onto a stator insulator. Patent document 3 discloses the stator insulator with a structure that allows the coil to be wound and held in a designed pattern structure even when the coil is surrounded with the insulator in multiple layers.

Patent document 4 relate to an anti-break down motor stator tooth bar assembly. Patent document 4 discloses a stator tooth bar, two sides of the stator tooth bar are respectively provided with winding grooves, and the stator tooth bar is sleeved with an insulation sleeve capable of covering two ends of the stator tooth bar and the winding grooves and the insulation sleeve comprises at least two sleeve sections successively jointed along the axial direction of the stator tooth bar, and a joint end of one sleeve section is seamlessly jointed with a joint end of the other adjacently disposed sleeve section through a complemented butt joint structure. However, in document 4 describes the assembly structure of the stator core but does not describe the structure of the insulator.

Patent document 5 relate to a stator of rotary electric machine. Patent document 5 discloses a first convexities and second convexities are formed in opposing first wall surfaces and second wall surfaces of lead wire end portion holding grooves, and in holding coil ends that are housed in the lead wire end portion holding grooves with the first convexities and the second convexities, the first convexities and the second convexities are formed at positions that are offset with respect to each other in a circumferential direction and one end portions of the coil ends of the same phase that are connection portions are drawn out towards an outer diameter side from between the first convexities and the second convexities.

The insulators applied to the patent document 1 and patent document 3 focus on the manufacturing cost, manufacturing time, assembly process, etc. thereof. However, in the insulators applied to the patent document 1 and patent document 3, the space constraints and the resulting insulation performance deterioration are not considered.

In addition, the insulator applied to Patent Document 2 and Patent Document 5 is implemented by combining the distal ends of parts of the insulator with each other in the overlapping manner. However, in the insulator applied to Patent Document 2 and Patent Document 5, a structure for securing insulation performance and securing clamping force between insulator parts which may be deteriorated due to the miniaturization of the motor is not considered.

In addition, in the insulator applied to Patent Document 2 as implemented by combining the distal ends of parts of the insulator with each other in the overlapping manner, a gap between the insulator parts may occur according to driving of the motor, and thus the insulation strength may be lowered.

Therefore, a novel insulator structure to secure the insulation performance, and improve coupling force between the insulator parts which may be deteriorated due to the miniaturization of the motor is required.

PRIOR ART DOCUMENTS

Patent Literature

Patent Document 1: KR 10-2017-0003103 (published Jan. 9, 2017)
Patent Document 2: KR 10-2015-0142767 (published 23 Dec. 2015)
Patent Document 3: KR 10-2011-0077819 (published Jul. 7, 2011)
Patent Document 4: CN 203554084U (published Apr. 16, 2014)
Patent Document 5: US 9887601 (published Mar. 10, 2016)

SUMMARY OF THE INVENTION

One purpose of the present disclosure is to provide a stator with an improved insulator structure to secure insulation performance of the insulator surrounding teeth, that may deteriorate due to the miniaturization of the motor, and provide a motor including the same.

Further, another purpose of the present disclosure is to provide a stator surrounding teeth and having a configuration capable of securing coupling force between at least two insulator parts, and provide a motor including the same.

Further, another purpose of the present disclosure is to provide a motor with improved bus-bar and insulator structures by which spatial restrictions caused by miniaturization of the motor may be overcome.

Further, another purpose of the present disclosure is to provide a motor with improved bus-bar and insulator structures by which both of motor size reduction and insulation performance improvement may be achieved.

Further, another purpose of the present disclosure is to provide a high-speed 3-phase motor having a teeth-divided core and a concentrated winding to ensure performance improvement and miniaturization.

Further, another purpose of the present disclosure is to provide a motor in which connections of U, V, and W phases lead wires and neutral-point lead wires to terminals may be achieved while overcoming spatial restriction in a stator's outer diameter and a radial direction of a back yoke.

Further, another purpose of the present disclosure is to provide a motor with an improved insulator structure such that an insulation distance for each of U, V, and W phases lead wires and neutral-point lead wires may be secured while overcoming spatial restriction in a radial direction of a back yoke.

Further, another purpose of the present disclosure is to provide a motor in which a bus-bar and an insulator are coupled to a stator within an outer diameter of the stator purposed for miniaturization of the motor.

Further, another purpose of the present disclosure is to provide a motor in which a teeth-divided core is coupled to a stator core in an axial direction for connection of the lead wires to terminals.

Further, another purpose of the present disclosure is to provide a motor in which 3-phase power lead wires of coils may be connected to terminals without using a radial direction of the back yoke, and neutral-point lead wires of the coils may be pulled out straightly to a bottom of the motor and connected to terminals, such that the lead wires of the coils may be connected to the terminals within an outer diameter of the stator.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

To achieve the various purpose of the present disclosure, an insulator may be divided into upper and lower insulators which are coupled to each other via a coupling portion for improving the coupling force, and the insulator may have a straight cross-section for alignment of winding of a coil.

In the exemplary embodiment of the present disclosure, in consideration of the winding operation, the coupling force between the upper and lower insulators may be secured in a region having the maximum thickness of the insulator.

In an exemplary embodiment of the present disclosure, an insulator may be divided into upper and lower insulators which are coupled to each other via a coupling portion, wherein the coupling portion may include a protrusion and a groove engaged with each other formed on the upper and lower insulators respectively.

In a first aspect, the present disclosure proposes a stator for a motor, the stator including: a stator core; teeth coupled to the stator core; and a hollow insulator coupled to each tooth, wherein each tooth includes: a body extending in a radial direction of the stator core, wherein and a coil is wound around the body; and a pole shoe branching from one end of the body, wherein an outer face of the pole shoe is curved, and a gap is defined between the pole shoe and a rotor, wherein the insulator includes: a coil-wound portion surrounding an outer circumferential face of the tooth; and both side walls respectively extending from both sides of the coil-wound portion, wherein the both side walls and the coil-wound portion defines a space receiving the coil, wherein one of the both side walls includes a coupling portion, wherein the insulator are divided into two parts and the two parts are coupled to each other via the coupling portion such that the tooth is inserted into and coupled to the insulator.

In one implementation of the first aspect, the two parts includes: an upper insulator surrounding an upper portion of an outer circumferential face of the tooth; and a lower insulator connected to the upper insulator and surrounding a lower portion of an outer circumferential face of the tooth.

In one implementation of the first aspect, the one side wall has a predetermined thickness, and the coupling portion is formed within a region of the thickness.

In one implementation of the first aspect, the thickness is defined in a radial direction of the stator core.

In one implementation of the first aspect, the both side walls includes: an inner side wall for insulating between the rotor and the coil; and an outer side wall for insulating between the coil and the stator core.

In one implementation of the first aspect, the coupling portion is formed in a cross section of the outer side wall.

In one implementation of the first aspect, the lower insulator has an extension wall upwardly extending from a top of the lower insulator, wherein the upper insulator has a step portion downwardly extending from a bottom of the upper insulator, wherein the extension wall is mated with the step portion.

In one implementation of the first aspect, the extension wall defines an inner face of the insulator.

In one implementation of the first aspect, the insulator has a curved groove defined in a portion thereof close to an inner circumferential face of the stator core, wherein the coil is received in the groove and drawn out.

In one implementation of the first aspect, one end of the coil is drawn out from the tooth to define one of 3-phases power lead wires, while the other end of the coil is drawn from the tooth to define a neutral-point lead wire, wherein the drawing-out directions of the two ends of the coil are different from each other.

In one implementation of the first aspect, each of the 3-phase power lead wires is drawn out toward an inner circumferential face of the stator core.

In one implementation of the first aspect, each of the 3-phase power lead wires is connected to a terminal above the stator core, while each neutral-point lead wire is connected to a terminal below the stator core.

In a first aspect, the present disclosure proposes a motor comprising: a stator; and a rotor rotatable with respect to the stator, wherein the stator includes: a stator core defining a back yoke; teeth extending radially and inwardly of the stator core; each coil wound around each tooth; and a hollow insulator coupled to each tooth and surrounding each tooth, wherein the insulator are divided into two parts and the two parts are coupled to each other via a coupling portion formed on each of the parts such that the tooth is inserted into and coupled to the insulator.

In one implementation of the second aspect, the two parts includes: an upper insulator surrounding an upper portion of an outer circumferential face of the tooth; and a lower insulator connected to the upper insulator and surrounding a lower portion of an outer circumferential face of the tooth.

In one implementation of the second aspect, each of the upper and lower insulators has both side walls, wherein the both side walls includes: an inner side wall for insulating between the rotor and the coil; and an outer side wall for insulating between the coil and the stator core.

In one implementation of the second aspect, the outer side wall has a predetermined thickness, and the coupling portion is formed in a cross section of the outer side wall.

In one implementation of the second aspect, the lower insulator has an extension wall upwardly extending from a top of the lower insulator, wherein the upper insulator has a step portion downwardly extending from a bottom of the upper insulator, wherein the extension wall is mated with the step portion.

In one implementation of the second aspect, the extension wall defines an inner face of the insulator.

In one implementation of the second aspect, the insulator has a curved groove defined in a portion thereof close to an inner circumferential face of the stator core, wherein the coil is received in the groove and drawn out.

In one implementation of the second aspect, one end of the coil is drawn out from the tooth to define one of 3-phases power lead wires, wherein each of the 3-phase power lead wires is drawn out toward an inner circumferential face of the stator core and received in the groove.

The features of the above-described embodiments may be implemented in a combined manner in other embodiments as long as they are not inconsistent with other embodiments.

Effects of the present disclosure are as follows but are not limited thereto.

According to the present disclosure, not only may the insulator wrap all the teeth of a small three-phase motor to ensure insulation strength, but also improve the coupling force between the insulators.

In addition, forming a structure capable of securing the coupling force in the region of the maximum thickness in the insulator for stable fixing and winding of the coil may allow the overall thickness of the insulator to be smaller.

In addition, forming a stepped structure and an extension structure mating with each other on the upper and lower insulators may allow the insulation strength to be secured even when a gap occurs between the both insulators in the driving of the motor.

According to the present disclosure, an outer diameter of the stator may be reduced and a radial thickness of the back yoke may be reduced, thereby realizing miniaturization and weight lightening of the motor.

In addition, connection of the 3-phases power (U, V, and W) and neutral-point lead wires to the terminals may be achieved while not being limited based on the radial thickness of the back yoke.

In addition, the insulator module is coupled to the stator core in the axial direction. This may minimize the radial thickness of the stator core such that the motor may be miniaturized.

In addition, the insulation distances between the stator core and the bus-bar (U, V, and W phases lead wires) and the neutral-point lead wire connection ring are secured to ensure insulation improvement.

In addition, in order to speed up and miniaturize the motor, the concentrated winding scheme around the teeth-divided core may be applied. The teeth-divided core may be axially coupled to the stator core to facilitate the lead wire connection to the terminals.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Figure 1:
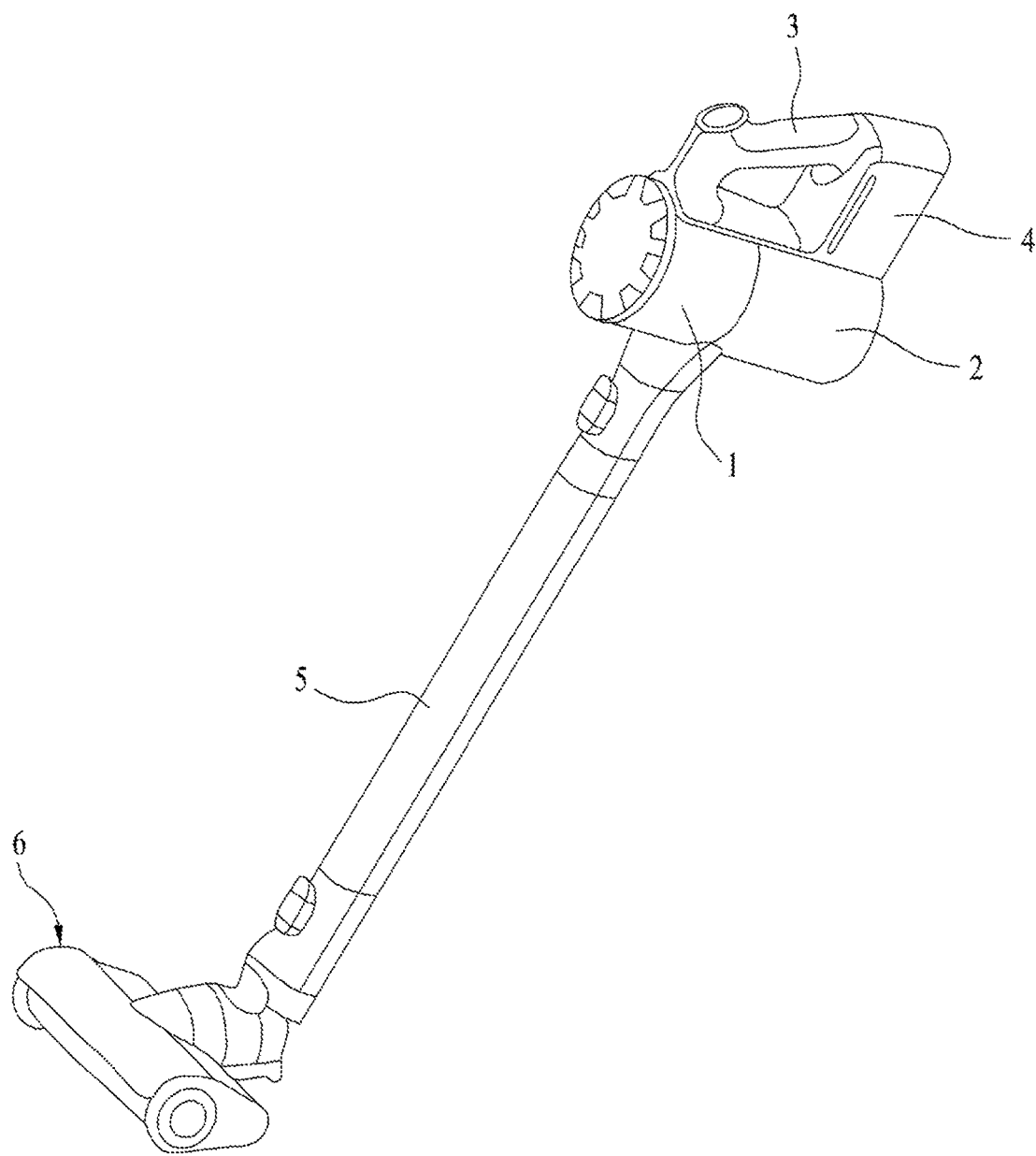
FIG. 1 is a perspective view of a conventional cleaner.

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Herein, a stator core is formed in a hollow cylindrical shape. Thus, the stator core defines an arc of a back yoke. As used herein, a radial and inward direction refers to a direction radially and inwardly of an arc of an inner face of the stator core or means a direction radially and inwardly of the back yoke.

In addition, connection of 3-phase power lead wires to be described later means an electrical connection. However, the connection of 3-phase power lead wires may mean a physical connection. The physical connection of the 3-phase power lead wires may lead to the electrical connection of the 3-phase power lead wires. Hereinafter, 'connection' and 'coupling' may be used in an interchangeable manner with each other.

FIG. 1 is a perspective view of a conventional cleaner.

Referring to FIG. 1, a vacuum cleaner may include a cleaner main body 1 with a motor for generating a suction force, a suction nozzle 6 for sucking air containing dust, and an extension tube 5 for connecting the cleaner main body 1 and the suction nozzle 6 with each other.

Although not shown, the suction nozzle 6 may be directly connected to the cleaner main body 1 without the extension tube 5.

The cleaner main body 1 may include a dust container 2 in which dust separated from air is stored. Accordingly, dust introduced through the suction nozzle 6 may be stored in the dust container 2 through the extension tube 5.

The cleaner main body 1 may be provided with a handle 3 for a user to grip. The user may perform cleaning while gripping the handle 3. The cleaner main body 1 may include a battery (not shown), and the cleaner main body 1 may include a battery accommodating portion 4 in which the battery (not shown) is accommodated. The battery accommodating portion 4 may be provided below the handle 3. The battery (not shown) may be connected to the suction nozzle 6 to supply power to the suction nozzle 6.

Figure 2:
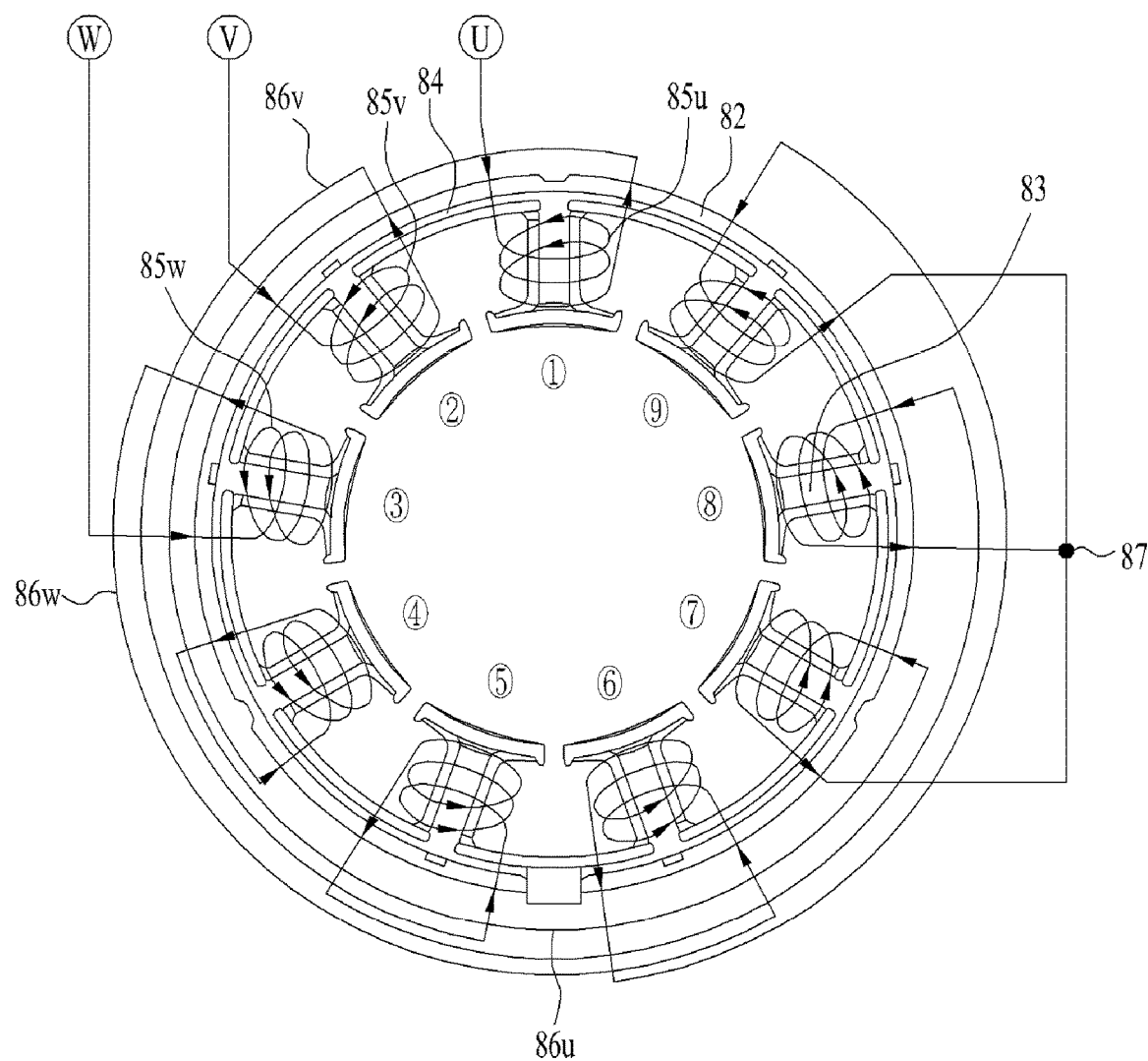
FIG. 2 is a plan view illustrating winding of a conventional coil.

FIG. 2 is a plan view illustrating winding of a conventional coil.

Referring to FIG. 2, a structure of a conventional inner rotor type motor and coil winding thereof will be described. In the conventional inner rotor type motor, teeth 83 extend from a stator core 82 radially inwardly of the stator core 82. The conventional inner rotor type motor may include an insulator 84 for insulating the stator core 82 from the coil.

In the conventional coil winding, a u-phase coil 85$u$ is wound around a 1st tooth 83 clockwise (in a direction of an arrow). The coil does not necessarily have to be wound clockwise. In either case, coils of respective phases have to be wound in the same direction.

When the coil winding around the tooth 83 is finished, the u-phase coil 85$u$ is drawn out of the insulator 84 and then is wound around 4th and 7th teeth sequentially in the same direction as the direction in which the coil is wound around the 1st tooth. Thus, two coil connection wires 86$u$ may be formed outwardly of the insulator 84. Similarly, a v-phase coil 85$v$ is wound around 2nd, 5th, and 8th teeth sequentially in the same manner as the winding manner of the u-phase coil. Thus, two connection wires 86$v$ may be formed. Further, a w-phase coil 85$w$ is wounded around 3rd, 6th, and 9th teeth sequentially. Thus, two connection wires 86$w$ may be formed. The 3-phases power coils are wound around the 9th, 8th, and 7th teeth, respectively, and then are drawn out of the insulator 84 and are joined with each other to form a neutral-point lead wire 87 outwardly of the insulator 84.

The connection wires 86 extend along an outer circumferential face of the insulator. Further, arrangement and insulation of the connection wires 86 are performed by utilizing a radial thickness of a back yoke defining the stator core 82.

That is, in the conventional motor, the arrangement and insulation of the lead wires of the coils are performed using the radial thickness of the back yoke. This causes difficulty in miniaturizing and reducing an overall size of the motor. In addition, although not shown in the drawing, a terminal to connect to each of the 3-phases power lead wires and the neutral-point lead wire should be disposed within the radial thickness of the back yoke to secure an insulation distance.

FIG. 1 and FIG. 2 as described above have described the schematic configurations of the small motor and the inner rotor type motor used in the cleaners. A motor to be described in following embodiments of the present disclosure is also a small motor used in the cleaner or the like. The motor includes an insulator structure allowing securing an insulation performance of the motor while reducing a size and a weight of the motor.

Hereinafter, a motor according to an embodiment of the present disclosure will be described with reference to FIGS. 3 to 7.

Figure 3:
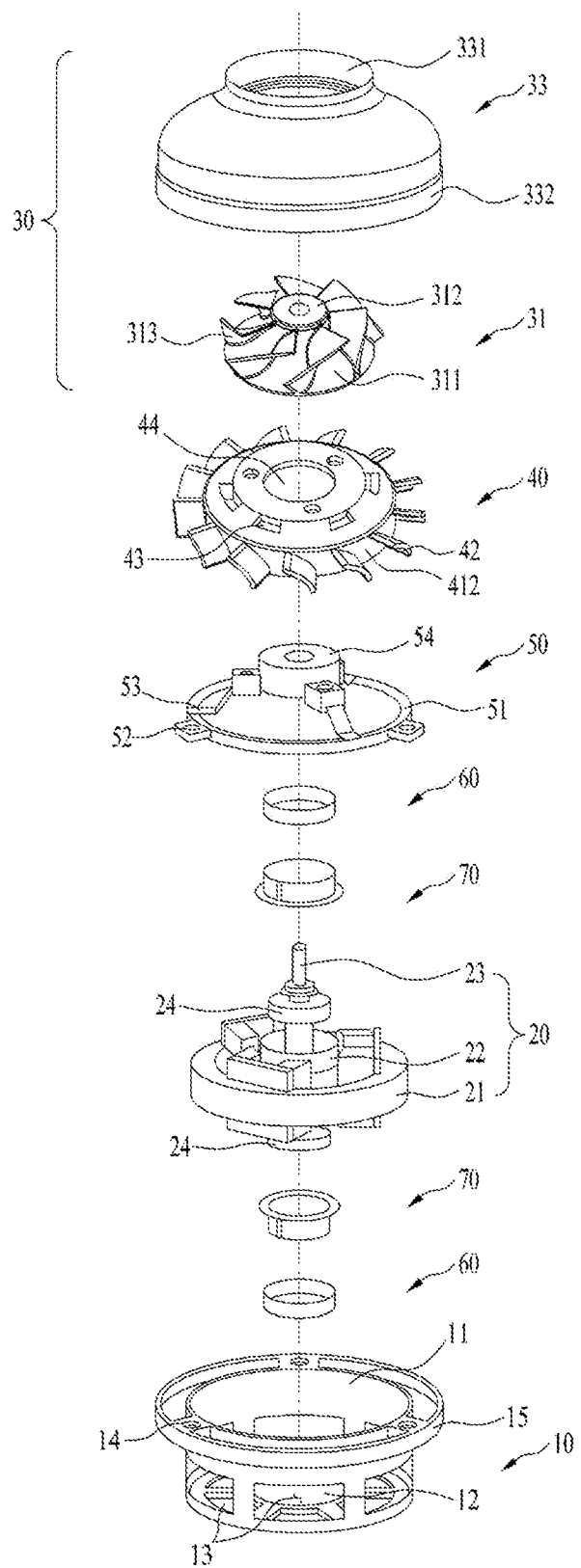
FIG. 3 shows an overall configuration of a motor according to an embodiment of the present disclosure.

FIG. 3 shows an overall configuration of a motor according to an embodiment of the present disclosure.

FIG. 3 shows an overall motor structure of the present embodiment. Connection and insulation structures of the coils and a structure of the insulator will be omitted in FIG. 3. Those omitted in the present drawing will be described in FIGS. 4 to 7 below. It will be understood that the features of FIGS. 4 to 7 are applied to the overall configuration of FIG. 3.

A motor assembly in accordance with the present embodiment includes a motor 20, a housing for receiving the motor 20 therein and defining an overall frame of the motor, a flow generator 30 installed on a top of the housing to generate air flow, and a diffuser 40 for dispersing the air flow generated by the flow generator 30.

The motor 20 includes an annular stator 21, a shaft 23 penetrating a center of the stator 21, and a rotor 22 into which the shaft 23 is mounted. The rotor 22 generates a rotational force via interaction with the stator 21. Further, the shaft 23 is rotatably supported by a bearing 24.

The motor 20 of the present embodiment is illustrated as a brushless direct current motor (BLDC motor). In the present drawing about the BLDC motor, a structure in which the stator 21 is disposed outwardly of the rotor 22 is illustrated. However, the present disclosure is not limited thereto. A motor having a structure in which the stator 21 is disposed inwardly of the rotor 22 is not excluded.

In the drawing, the motor housing 10 is shown below the motor 20 and has a space defined therein for accommodating the motor 20 therein. The motor housing 10 includes a cylindrical motor mounting portion 11 with an open top, a connection arm 14 radially outwardly extending from an upper end of the motor mounting portion 11, and an annular body coupling portion 15 provided at an end of the connection arm 14 and having a diameter larger than that of the motor mounting portion 11. A bottom center portion of the motor mounting portion 11 may include a bearing support 12 for fixing and supporting a bearing 24 at a lower portion of the motor 20.

The bearing 24 may be installed in a form of a bearing assembly in which a bearing holder 70 and an elastic mesh 60 are sequentially wound on an outer circumferential face of the bearing 24.

A bracket 50, the diffuser 40, and the flow generator 30 may be provided above the motor 20, and the flow generator 30 may include an impeller 31 and an impeller cover 33.

The bracket 50 may include a center portion 54 aligned with a hole 44 defined in a central portion of the diffuser and a support 51 formed in an annular shape and having a radius larger than that of the center portion 54. Further, a connecting portion 53 for connecting the center portion 54 and the support 51 with each other may be formed.

In addition, the support 51 may include a fastening portion 52 protruding in a radial direction to be fastened to the motor housing 10, thereby supporting an upper portion of the motor 20.

The diffuser 40 has the hole 44 defined in the center portion thereof.

Further, a plurality of cooling flow path outlets 43 are provided along an outer circumferential face of the hole 44 to define flow paths through which heat generated by the motor 20 discharges.

In one example, a cylindrical portion 412 for forming an outer diameter corresponding to an outer diameter of a side wall of the motor mounting portion 11 along a radial direction of the diffuser 40 is formed and a plurality of vanes 42 are formed along an outer circumferential face of the cylindrical portion 412, thereby guiding flow of air pressurized by the impeller 31.

The impeller 31 is installed above the diffuser 40, and a shaft hole 312 into which the shaft 23 is inserted is provided at a center of the impeller 31. The impeller 31 may be a diagonal flow type impeller in which the shaft hole 312 is defined in a hub 311 that supports the impeller 31 for securing an overall rigidity thereof, the hub 311 has a face inclined downward in a radial direction from a center of rotation, and a radial blade 313 is included.

The impeller cover 33 includes an air inlet 331 defined in an upper center portion thereof, which is a passage through which air moves, and is provided in a form inclined downward with respect to the air inlet 331. A cover coupling portion 332 is provided at a lower end of the impeller cover 33. The cover coupling portion 332 may be provided in a step shape, and the body coupling portion 15 may be fitted into the step-shaped cover coupling portion 332.

Figure 4:
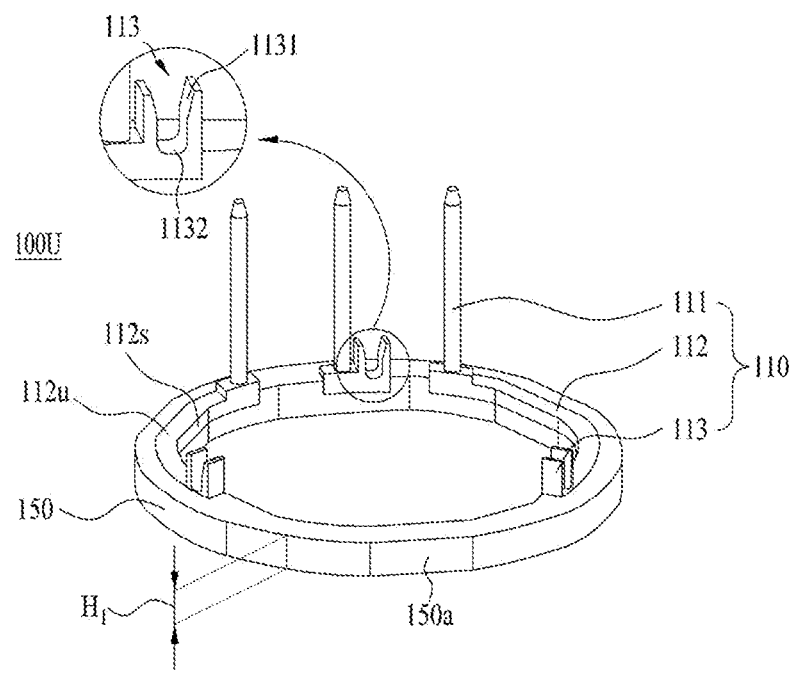
FIG. 4 is an exploded perspective view of a motor according to one embodiment of the present disclosure.
Figure 4:
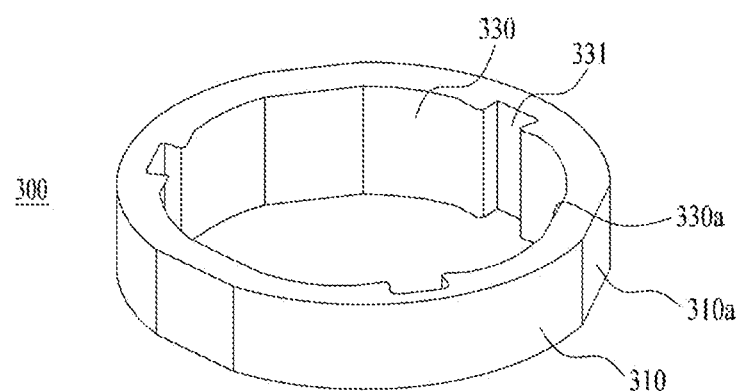
Figure 4:
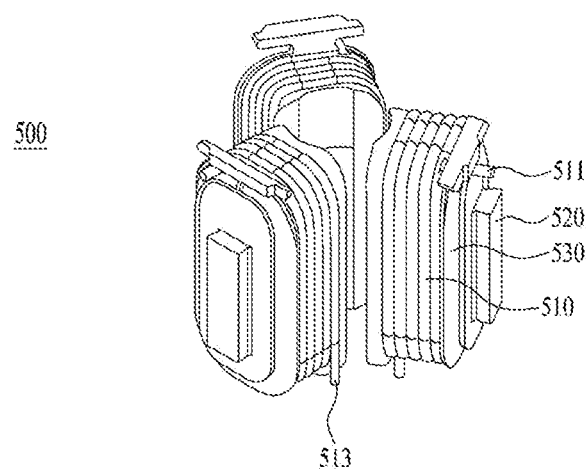

FIG. 4 is an exploded perspective view of a motor according to one embodiment of the present disclosure.

Referring to FIG. 4, a motor of the present embodiment includes a stator and a rotor configured to rotate with respect to the stator. The stator may include a stator core 300 defining a back yoke, teeth 520 extending in a radial direction from the back yoke, a coil 510, an insulator module 100 coupled to upper and lower portions of the stator core 300, and a divided-core 500 inserted into the stator core 300 in an axial direction.

The teeth 520 extend radially inwardly (inner type) of the back yoke in the present embodiment. However, the present disclosure is not necessarily limited thereto. The teeth 520 may extend radially outwardly (outer type) of the back yoke.

In addition, in the present embodiment, a configuration is described in which a concentrated winding scheme around the teeth 520 is applied and a teeth-divided core is inserted into the stator core 300 in an axial direction (longitudinal direction) thereof. This configuration is employed because space constraint occurs due to a small size of the stator core 300 caused by the miniaturization of the motor and, thus, it is difficult to couple the teeth-divided core with the back yoke of the stator in a radial direction of the motor.

The insulator module 100 may include an upper insulator 100U coupled to a top face of the stator core 300 and a lower insulator 100L coupled to a bottom face of the stator core 300.

The upper insulator 100U may include a power terminal unit 110 connected to each of 3-phases power wires constituting the coil 510 and an upper insulator body 150 for insulating the power terminal unit 110 from the stator core 300.

Each power terminal unit 110 in accordance with the present embodiment includes a power terminal 113 protruding from the top of the body 150 within the radial region of the back yoke and connected to one of the 3-phase power lead wires 511 of the coil 510, a connection terminal 111 connected to the power terminal 113 and connected to the one of the 3-phase power lead wires 511, and a power connecting member 112 having one end connected to the power terminal 113 and the other end connected with the connection terminal 111.

The power terminal 113 may include a power terminal body 1132 upwardly protruding from the insulator body 150 and a guide groove 1131 defined in the body 1131 to receive and guide one of the 3-phase power lead wires 511 of the coil 510.

Each 3-phase power lead wires 511 may be fitted into the guide groove 1131. Preferably, the groove 1131 may have a width smaller than a diameter of the 3-phase power lead wire 511. Thus, the 3-phase power lead wire 511 may be press-fitted into the guide groove 1131.

In one example, a bottom face of the guide groove 1131 may have a predetermined angle of inclination to guide each 3-phase power lead wire 511.

The connection terminal 111 may be connected to each of the 3-phases power lead wires. Although not shown in the drawing, the connection terminal 111 is connected to a printed circuit board (PCB). The connection terminal 111 may be connected to the power terminal 113 via the power connecting member 112.

The power connecting member 112 electrically and physically connects the power terminal 113 and the connection terminal 111 with each other. A top face 112u of the power connecting member 112 may define a portion of a top face of the upper insulator 100U. A side face 112s of the power connecting member 112 may define a portion of the inner circumferential face of the upper insulator 100L.

That is, the top face 112u of the power connecting member 112 may be located on the top face of the upper insulator body 150 of the upper insulator 100U. The connection terminal 111 may extend upward from the top face 112u. The side face 112s of the power connecting member 112 may be curved to correspond to the circular shape of the upper insulator body 150 of the upper insulator 100U to define a portion of the inner circumferential face of the upper insulator 100U. Thus, the power connecting member 112 may define a top portion of the upper insulator 100U.

However, the top face 112u of the power connecting member 112 does not necessarily define the top face of the upper insulator 100U. The insulator body 150 may be formed on the top face 112u of the power connecting member 112 such that the insulator body 150 may define a top face of the upper insulator 100U. In this case, the top face 112u of the power connecting member 112 may be surrounded with the insulator body 150.

The insulator body 150 in the present embodiment may be coupled to the top face of the stator core 300, have a first height H1 for securing the insulation distance from the stator core 300, and have a predetermined thickness in the radial direction. In addition, the insulator body 150 may be formed in a hollow cylindrical shape corresponding to the shape of the stator core 300.

The power terminal unit 110 may be located within the first height H1 in the upper insulator 100U. That is, the insulation distance between the power terminal unit 110 and the stator core 300 may be secured by the first height H1.

The stator core 300 may be formed in a hollow cylindrical shape and have a space defined therein into which the divided-core 500 is inserted. Each of the inner circumferential face 330 and the outer circumferential face 310 of the stator core 300 may be partially flattened.

That is, planar faces 310a and 330a may be formed on the inner circumferential face 330 and the outer circumferential face 310 of the stator core 300, respectively.

Due to the planar faces 310a and 330a, the radial thickness of the stator core 300 may be reduced to reduce the overall size of the motor. Further, due to the planar faces 310a and 330a, a portion that may act as a resisting portion against magnetic flux flowing through the stator core 300 may be reduced to improve the performance of the motor.

In one example, a shape of each body of the insulator module 100 may be a hollow cylindrical shape, which corresponds to the shape of the stator core 300. Planar faces 151a may be formed at portions of the outer and inner circumferential faces of the insulator body 150 that are in contact with the planar faces 310a and 330a respectively.

In one example, a shape of each of the bodies 150 and 155 of the upper and lower insulators 100U and 100L may be a hollow cylindrical shape, which corresponds to the shape of the stator core 300. Planar faces 150a may be formed at portions of the outer and inner circumferential faces of the upper insulator body 151 that are in contact with the planar faces 310a and 330a respectively. Planar faces 155a may be formed at portions of the outer and inner circumferential faces of the lower insulator body 155 that are in contact with the planar faces 310a and 330a respectively.

In addition, at least one groove 331 may be defined in a portion of the inner circumferential face 330 of the stator core 300 along a circumference of the inner circumferential face 330. A tooth 520 of the divided-core 500 may be engaged with the groove 331 in the axial direction (the longitudinal direction of the stator core).

In one example, the upper insulator body 150 may include the protrusion 153. The protrusion 153 may protrude radially and inwardly of the insulator body in the present embodiment.

The upper insulator body 150 is formed in the hollow cylindrical shape. Thus, the radially and inward direction refers to a direction radially and inwardly of an arc of the inner face of the upper insulator body 150. As used herein, the radially and inward direction may mean a direction radially and inwardly of the back yoke.

In one example, the lower insulator 100L is coupled to the bottom face of the stator core 300. The lower insulator 100L may include a neutral terminal unit 130 connected to the neutral power wire of the coil 510 and may include lower insulator bodies 155 and 157 surrounding at least a portion of the outer circumferential face of the neutral terminal unit 130.

The neutral terminal unit 130 may include neutral terminals connected to the neutral-point lead wire of the coil 510 and a neutral connecting member 132 for connecting the neutral terminals 131 with each other.

The lower insulator bodies may include a first insulator body 157 surrounding the neutral terminal 131 and having a hollow shape and a second insulator body 155 surrounding the outer circumferential face of the neutral connecting member 132.

The neutral connecting member 132 may be bent in a corresponding shape to the shape of the second lower insulator body 155 and thus form an inner portion of the lower insulator 100L.

Each of the neutral terminals 131 may extend radially and inwardly of the back yoke from the neutral connecting member 132. The neutral terminal 131 may partially extended in the axial direction from the neutral connecting member 132 and then be bent to extend radially and inwardly of the back yoke. This configuration may be proposed for a following reason. In the present embodiment, the insulator bodies 155 and 157 surround only a portion of the outer circumferential face of the neutral terminal unit 130, and, thus, the neutral terminals 131 are exposed to the outside. Thus, the configuration is to secure an insulation distance between the neutral terminals 131 and the divided-core 500 and the stator core 300.

That is, securing the insulating distance structurally may allow a number of members for the insulation to be reduced.

After the first insulator body 157 and the neutral terminal unit 131 are manufactured via an insert injection molding, the combination of the first insulator body 157 and the neutral terminal unit 131 may be mounted and fixed to the second insulator body 155.

In one example, the first insulator body 157 may have a guide hole 1571 defined therein for guiding the insertion of the neutral-point lead wire 513. A hole may be formed in the neutral terminal unit 130 at a position corresponding to the guide hole 1571 so that the neutral-point lead wire 513 may pass through the guide hole 1571, and then connected to the neutral terminal unit 130.

Figure 5A:
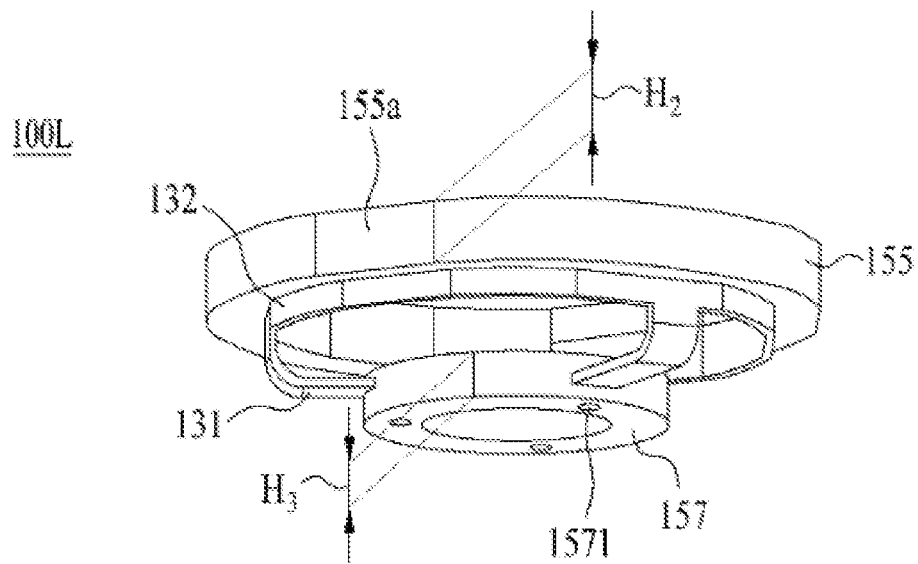
FIGS. 5A and 5B are perspective views showing examples of a lower insulator.
Figure 5B:
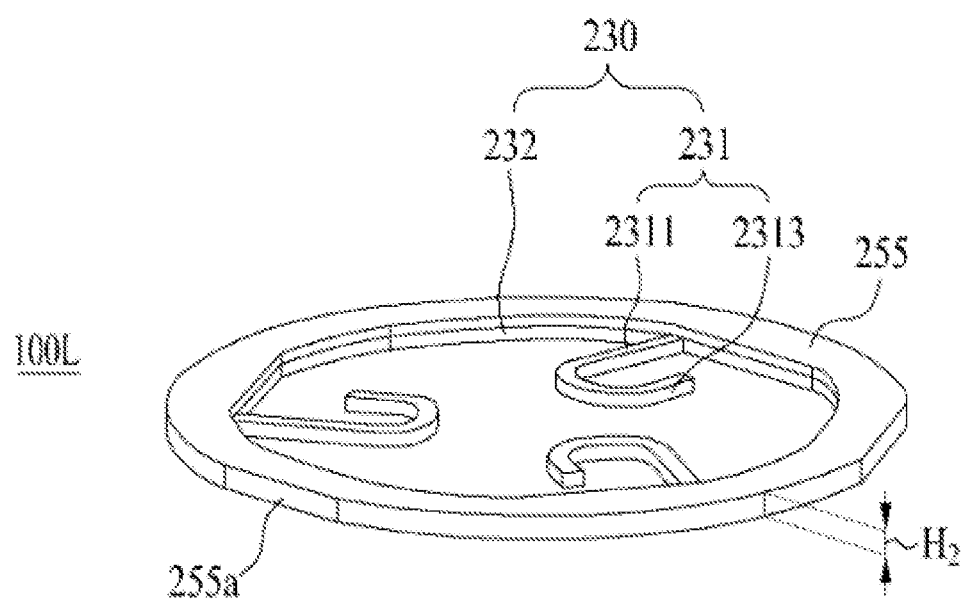

FIGS. 5A and 5B are perspective views of examples of a lower insulator.

FIG. 5A is a view showing the first insulator body 157 and the second insulator body 155 having the above-described ring type. The same content as the above description is omitted.

The second insulator body 155 may have a second height H2, and the first insulator body 157 may have a third height H3.

Each of the heights may be sized for securing the insulation distance of the neutral terminal unit 130. The second height H2 may include a height of the neutral connecting member 132, and the third height H3 may be sized such that the first body 157 surrounds a portion of the neutral terminal 131 connected to the neutral-point lead wire 513.

FIG. 5B is a perspective view of a lower insulator according to another embodiment of the present disclosure.

Referring to FIG. 5B, the lower insulator 100L in another embodiment may be coupled to the bottom face of the stator core 300, have a height H2 for securing the insulation distance from the stator core 300, and have a predetermined thickness in the radial direction.

In addition, the lower insulator 100L may be formed in a hollow cylindrical shape corresponding to the shape of the stator core 300. A planar face 255a may be formed on an outer face of a lower insulator body 255.

Each neutral terminal 231 may be formed in a hook shape, and may include an extension 2311 protruding inwardly of the lower insulator 100L from the neutral connecting member 232 and a hook 2313 bent from one end of the extension 2311 toward an inner circumferential face of the lower insulator body 255.

However, the shape of the neutral terminal 231 is not limited to a structure only including the extension 2311 and the hook 2313. Various shapes thereof configured such that the neutral terminal 231 is formed inside the lower insulator body 255 and is connected to each neutral-point lead wire 513 may be included herein.

Therefore, the lower insulator 100L may be formed as a combination of the neutral terminal unit 230 and the lower insulator body 255. The lower insulator body 255 defines a lowermost layer and an uppermost layer of the lower insulator 100L. The neutral terminal unit 230 may define an intermediate layer of the lower insulator 100L. In one example, since a receiving groove in which the neutral terminal unit 230 is seated is defined in the intermediate layer, a remaining portion except for the neutral terminal unit 230 in the intermediate layer may be defined by the lower insulator body 255.

The lower insulator 100L may be produced in an insert injection molding manner, or may be produced by stacking components respectively forming layers of the lower insulator 100L.

Figure 6:
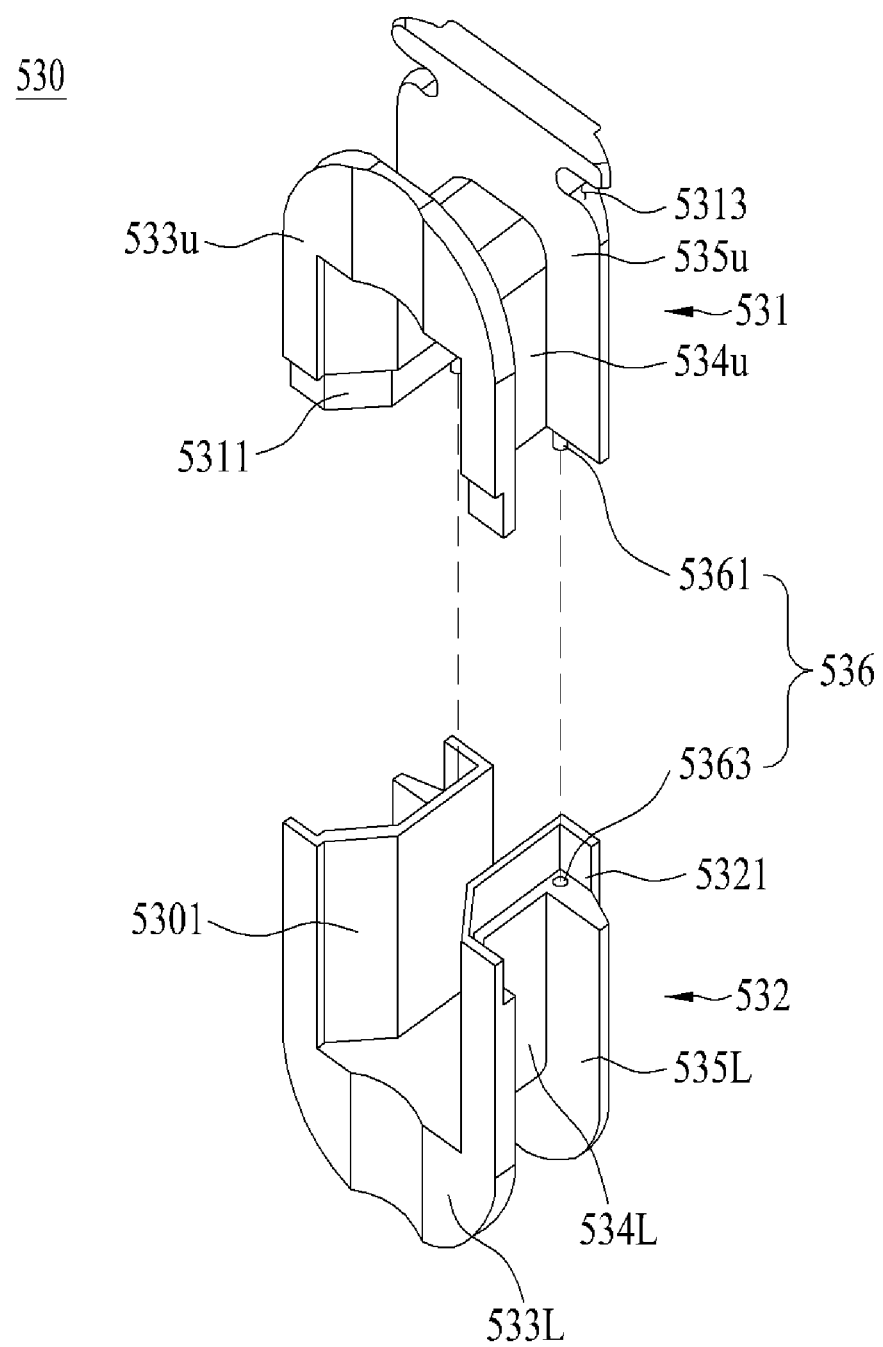
FIG. 6 is an exploded view of the lower insulator of FIG. 4.
Figure 7:
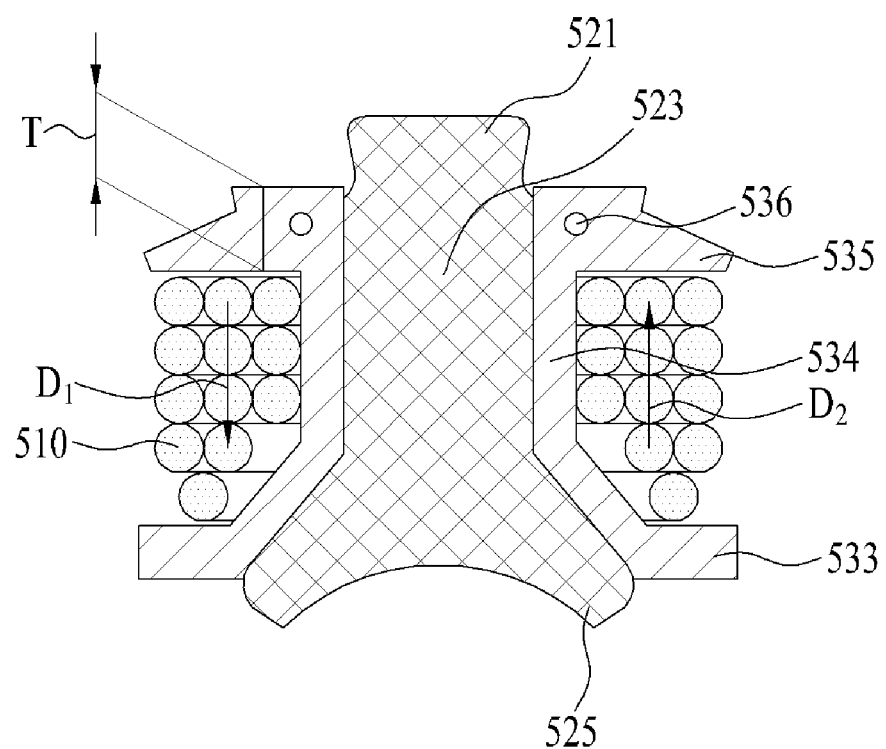
FIG. 7 shows a cross-sectional view of a divided core.

FIG. 6 is an exploded view of the lower insulator of FIG. 4. FIG. 7 shows a cross-sectional view of a divided core.

In FIG. 7, the divided-core 500 may include an insulator 530 surrounding the tooth 520 and insulating the coil 510 from the tooth 520. The insulator 530 surrounds outer faces of a body 523 and a pole shoe 525 of the tooth 520 and defines a section in which the coil 510 is wound.

Referring to FIGS. 6 and 7, the insulator 530 in the present embodiment may include a coil-wound portion 534 surrounding the outer circumferential face of the tooth 520, and both side walls 533 and 535 extending from both ends of the coil-wound portion 534 to form a space in which the coil 510 is received. Each of the both side walls 533 and 535 may include a coupling portion 536.

The insulator 530 may include a first insulator 531 surrounding an upper portion of an outer circumferential face of the tooth 520 and a second insulator 532 connected to the first insulator 531 and surrounding a lower portion of the tooth 520.

In other words, in this embodiment, the insulator is of a divided type insulator. The upper insulator surrounds an upper portion of the tooth while the lower insulator surrounds a lower portion thereto. However, the present disclosure is not necessarily limited to this embodiment. Various embodiments for coupling divided insulators using the coupling portion may be employed in which an overall thickness of the insulator may be smaller according to the miniaturization of the motor, and the coupling portion is disposed at a maximum thickness portion of the insulator in order to prevent the shape change of the insulator during winding of the coil. For example, the insulator may be divided in a horizontal direction of the tooth.

In the present embodiment, the maximum thickness of the insulator may be formed at the outer side wall 535 of the both side walls. That is, each of both side walls may have a predetermined thickness T. The coupling portion 536 is disposed within the thickness T. The thickness T may extend along the radial direction of the stator core 300.

In detail, the both side walls may include an inner side wall 533 for insulating between the coil 510 and a rotor and an outer side wall 535 disposed between the coil and the inner circumferential face 330 of the stator core 300 to insulate between the stator core 300 and the coil 510. The coupling portion 536 may be formed in a cross section of the outer side wall 535.

The tooth 520 may include a protrusion 521 coupled to the groove 331 of the stator core 300, a body 523 extending in the radial direction of the back yoke from the protrusion 521, and a pole shoe 525 branching from the body 523 to form a magnetic circuit.

The pole shoe 525 branches from the body 523 and has a curved inner face along a virtual circumferential face inside the stator core 300. Further, each of the neutral-point lead wires 513 may be connected to the terminal at a position between the inner circumferential face 330 of the stator core 300 and the virtual circumferential surface to ensure an insulation performance.

The insulator 530 is configured to surround the outer circumferential face of the tooth 520 disposed between the inner circumferential face of the stator core 300 and the virtual circumferential surface formed by the pole shoe 525.

Thus, the coil-wound portion 534 may surrounds the outer circumferential face of the tooth 520. The inner side wall 533 extends from the coil-wound portion 534 and is located between the rotor and the coil. The outer side wall 535 extends from the coil-wound portion 534 and is located between the inner circumferential face 330 of the stator core 300 and the coil.

The insulator 530 may have a thickness T of the outer side wall 535 as a maximum thickness of the insulator 530. This is because the coil-wound portion 534 on which the coil 510 is wound should have a minimum thickness to increase the number of windings of the coil.

The inner side wall 533 may have preferably a minimized thickness in consideration of a gap between the pole shoe 525 and the rotor and the winding section of the coil.

In detail, the thickness of the inner side wall 535 may be defined in the radial direction of the stator core 300. However, since the gap between the rotor and the pole shoe should be secured, the thickness of the inner side wall 535 should be reduced while reducing the section in which the coil is wound. That is, the inner side wall 533 may be located between the rotor and the coil, and may be formed to a minimum thickness to prevent the shape change of the insulator during winding of the coil.

Therefore, the maximum thickness of the insulator 530 is defined at the outer side wall 535. The outer side wall 535 may be in contact with the inner circumferential face 330 of the stator core 300 when the protrusion 521 is fitted into the groove 331 of the stator core. Thus, the outer side wall 535 may receive and overcome an external force that can be circumferentially applied to the tooth 520 when the motor is driven. In addition, the outer side wall 535 may allow the rigidity of the insulator 530 to be secured to prevent the shape change of the insulator 530 during the winding of the coil 510.

The coupling portion 536 may be formed within the thickness T of the outer side wall 535 to secure the coupling force between the divided upper and lower insulators.

The first insulator 531 may include a coil-wound portion 534U and both side walls 533U and 535U extending from both sides of the coil-wound portion 534U. The both side walls may include an inner side wall 533U and an outer side wall 535U.

The both side walls 533U and 535U may act as portions of both side walls of the insulator 530 described above to cover portions of the outer circumferential face of the tooth.

The outer side wall 535U may have a curved groove 5313. Each of the 3-phase power lead wires 511 of the coil 510 may be received in the groove 5313 and may be drawn out.

The outer side wall 535U is located between the upper portion of the tooth 520 and the stator core 300. As described above, the groove 5313 may be defined in a top portion of the outer side wall 535U such that each of the 3-phase power lead wires 511 may be connected to the upper insulator 100U.

That is, each of the 3-phase power lead wires 511 may be drawn out in the radial direction of the stator core 300 and received in the groove 5313 and then may be connected to the power terminal 113 in the upper insulator 100U.

The neutral-point lead wire 513 may be drawn out downwardly, that is, in a different direction than the drawing out direction of the 3-phase power lead wires 511, and then may be connected to the neutral terminal 131. In the present embodiment, the wire 513 may be withdrawn out downwardly of the teeth 520.

The 3-phase power lead wires 511 may be horizontally drawn out from the tooth, that is, in a radial direction of the stator core. Thus, the 3-phase power lead wires 511 may be horizontally drawn out from the tooth, that is, in a radial direction of the stator core and then upwardly drawn out and then connected to the terminal in the upper insulator 100U. The radial direction may be perpendicular to the extension direction of the rotation shaft of the motor.

The neutral point lead wire 513 may be withdrawn out downwardly of the teeth 520. To the contrary, the 3-phase power lead wires 511 may be drawn out upwardly of the teeth.

That is, the 3-phase power lead wires 511 may be connected to the terminal on above the stator core 300, while the neutral-point lead wires 513 may be connected to the terminals below the stator core 300.

In one example, the first insulator 531 may include a step portion 5311. The step portion 5311 may be formed as a bottom portion of the first insulator 531 and may be in contact with the second insulator 532.

An extension wall 5321 to be described below may be seated on the step portion 5311. When the extension wall 5321 is mated with the step portion 5311, the extension wall 5321 may form an inner face 5301 of the insulator 530.

The second insulator 532 may include a coil-wound portion 543L and both side walls 533L and 535L extending from both sides of the coil-wound portion 543L. The both side walls may include an inner side wall 533L and an outer side wall 535L.

The both side walls 533L and 535L of the second insulator may be connected to both side walls 533U and 535U to form both side walls of the insulator 530.

The second insulator 532 includes an extension wall 5321 as a top portion of the second insulator 532. The extension wall 5321 may form an inner surface of the insulator 530.

The extension wall 5321 may overlap with the step portion 5311. The coil-wound portion 534 may have a thickness equal to a sum of the thicknesses of the extension wall 5321 and the step portion 5311 as mated each other.

That is, when the extension wall 5321 and the step portion 5311 overlap each other, the extension wall 5321 defines an inner surface of the insulator 530, while the step portion 5311 may define an outer surface of the insulator 530.

When the extension wall 5321 and the step portion 5311 are mated with each other, a following effect may be achieved. When the coupling force of the coupling portion 536 is weakened due to the driving of the motor and thus a gap is formed between the first and second insulators, the combination of the extension wall 5321 and the step portion 5311 may block electrical communication between the teeth and the coil. This may ensure an insulating distance or strength between the teeth and the coil.

In one example, the coupling portion 536 may be provided in the thickness T of the outer side wall of each of the first insulator 531 and the second insulator 532. The first insulator 531 may have a protrusion 5361 as a coupling portion. The second insulator 532 may have a groove 5363 to which the protrusion 5361 is fitted. In another example, the coupling portion 536 may be defined within the thickness T, and the coupling portion 536 should be formed outside a region where the step portion 5311 and the extension wall 5321 are fitted with each other.

In the present embodiment, the coupling portion may include the groove 5363 and the protrusion 5361. However, the present disclosure is not necessarily limited thereto. The coupling portion 536 may be formed in the thickness T and include various shaped structures for coupling the divided two or more insulators 531 and 532 with each other.

Thus, as the coupling portion 536 is provided, the two or more insulator parts may be more firmly coupled to the teeth 520, thereby improving the coupling force. The coupling portion 536 formed in the outer wall forming the maximum thickness of the insulator 530 may realize miniaturization and weight reduction of the motor by reducing the overall thickness of the insulator 530.

FIG. 7 shows a cross-sectional view of a divided core.

Referring to FIG. 7, the divided-core 500 in the present embodiment is a teeth-divided core. Further, the divided-core 500 may be inserted into the stator core 300 along an axial direction perpendicular to the radial direction of the stator core 300.

The core 500 may include an insulator 530 surrounding the tooth 520 and insulating the coil 510 from the tooth 520. The insulator 530 surrounds outer faces of a body 523 and a pole shoe 525 of the tooth 520 and defines a section in which the coil 510 is wound.

As described above, the coil 510 may be wound around the tooth 520 in a concentrated winding manner. Further, the 3-phases power lead wires 511 may be drawn upwardly of the divided-core 500. Further, the neutral-point lead wires 513 may be drawn downwardly of the divided-core 500.

The motor of the present embodiment has a structure in which the divided-core 500 is inserted into the stator core 300 along the axial direction from a position below the stator core 300, and the upper insulator 100U is brought into contact with the top face of the stator core 300 in the axial direction, and the lower insulator 100L is brought into contact with the bottom face of the stator core 300 along the axial direction. Thus, the 3-phases power lead wires 511 should be connected to the terminals on a top face of the upper insulator 100U, while the neutral-point lead wires 513 should be connected to the terminals of the lower insulator 100L. Therefore, the lead wires from the coil 510 may be preferably drawn out in different directions, that is, upwardly and downwardly of the divided-core 500.

Further, the lead wires may be respectively connected to the terminals on the insulator module 100 within the radial distance of the back yoke.

In one example, when the coil 510 is wound in a first direction D1, the coil 510 is wound radially and inwardly of the tooth 520. The winding may begin in a clockwise or counterclockwise direction, downwardly of the tooth 520. Then, the coil 520 may be wound upwardly of the tooth 520 and then connected to the terminal.

When the coil 510 is wound in a second direction D2, the coil 510 is wound radially and outwardly of the tooth 520. The winding may begin in a clockwise or counterclockwise direction, downwardly of the tooth 520. Then, the coil 520 may be wound upwardly of the tooth 520 and then connected to the terminal.

A top portion of the tooth 520 may mean a portion close to the upper insulator 100U, and a bottom portion of the tooth 520 may mean an opposite portion to the top portion.

As a result, even when the coil 510 is wound in one of the first direction D1 and the second direction D2, the 3-phases power lead wires 511 may be drawn upwardly of the teeth 520 in the radial region of the back yoke while the neutral-point lead wires 513 may be drawn downwardly of the teeth 520 in the radial region of the back yoke.

In addition, each of the 3-phases power lead wires 511 may be preferably drawn out from a position located close to the pole shoe 525. Thus, each of the 3-phases power lead wires 511 may be easily connected to the power terminal 113 by directly inserting each of the 3-phases power lead wires 511 into the guide hole without bending each of the 3-phases power lead wires 511 because the power terminal 113 is disposed on a top face of the protrusion 153 of the upper insulator 100U.

The neutral terminal 131 may be disposed on an inner face of the lower insulator body 155, so that the neutral-point lead wires 513 may be connected to the terminals in the radial region of the back yoke, that is, in the radial region of the stator core 300.

Although the present disclosure has been described with reference to the preferred embodiments of the present disclosure, those skilled in the art may understand that the present disclosure may be variously modified and changed without departing from the spirit and scope of the present disclosure as described in the claims below.

What is claimed is:

1. A stator for a motor, the stator comprising:
a stator core;
teeth coupled to the stator core;
a rotor spaced apart from the stator core in a radial direction of the stator core; and
insulators, each of the insulators being coupled respectively to a tooth among the teeth and having a hollow shape configured to receive the tooth,
wherein the tooth comprises:
a body that extends in the radial direction of the stator core, and
a pole shoe that extends from one end of the body, wherein an outer surface of the pole shoe is curved and defines a gap between the pole shoe and the rotor,
wherein each of the insulators comprises:
a coil-wound portion that surrounds an outer circumferential surface of the tooth and that is configured to seat a coil, and
side walls that respectively extend from both sides of the coil-wound portion and that are spaced apart from each other in the radial direction, wherein the side walls and the coil-wound portion define a space configured to receive the coil,
wherein each of the insulators comprises a pair of parts coupled to each other, and one of the side walls comprises a coupling portion that couples the pair of parts to each other,
wherein the pair of parts of each of the insulators are coupled to each other to thereby define the coil-wound portion, the side walls, and a tooth receiving space that accommodates the tooth therein,
wherein the side walls of each of the insulators comprise:
an inner side wall that faces the rotor and that is disposed between the rotor and the coil, and
an outer side wall that faces the stator core and that is disposed between the coil and the stator core, and
wherein the outer side wall includes a first portion having a thickness greater than a thickness of the inner side wall, and the coupling portion is disposed within the first portion of the outer side wall.

2. The stator of claim 1, wherein the pair of parts of each of the insulators comprises:
an upper insulator that surrounds an upper portion of the outer circumferential surface of the tooth; and
a lower insulator that is connected to the upper insulator and that surrounds a lower portion of the outer circumferential surface of the tooth.

3. The stator of claim 2, wherein the lower insulator comprises an extension wall that extends upward from a top portion of the lower insulator, and
wherein the upper insulator comprises a step portion that extends downward from a bottom portion of the upper insulator and that mates with the extension wall.

4. The stator of claim 3, wherein the extension wall defines an inner surface of the insulator that faces the tooth.

5. The stator of claim 2, wherein each of the insulators defines a curved groove disposed at an outer portion of the insulator that faces an inner circumferential surface of the stator core, the curved groove being configured to receive the coil drawn out from the insulator.

6. The stator of claim 5, further comprising:
3-phases power lead wires and a neutral-point lead wire,
wherein the coil has a first end connected to one of the 3-phases power lead wires and drawn out from each of the insulators in a first direction, and a second end connected to the neutral-point lead wire and drawn out from each of the insulators in a second direction different from the first direction.

7. The stator of claim 6, wherein each of the 3-phase power lead wires is drawn toward the inner circumferential surface of the stator core.

8. The stator of claim 6, wherein each of the 3-phase power lead wires is connected to a power terminal disposed vertically above the stator core, and
wherein the neutral-point lead wire is connected to a neutral terminal disposed vertically below the stator core.

9. The stator of claim 1, wherein the thickness of the first portion is defined in the radial direction of the stator core.

10. The stator of claim 1, wherein the coupling portion is disposed on a surface of the outer side wall at an interface between the pair of parts of each of the insulators.

11. A motor comprising:
a stator; and
a rotor configured to rotate relative to the stator,
wherein the stator comprises:
a stator core,
teeth that extend radially inward of the stator core,
a coil that is wound around each tooth, and
insulators, each of the insulators being respectively coupled to a tooth among the teeth and having a hollow shape that surrounds the tooth,
wherein each of the insulators comprises a pair of parts that are coupled to each other and that define a tooth receiving space that accommodates the tooth, each of the pair of parts comprising a coupling portion that couples the pair of parts to each other,
wherein the pair of parts of each of the insulators are coupled to each other to thereby define a coil-wound portion, side walls, and the tooth receiving space that accommodates the tooth therein,
wherein the side walls of each of the insulators comprise:
an inner side wall that faces the rotor and that is disposed between the rotor and the coil; and
an outer side wall that faces the stator core and that is disposed between the coil and the stator core, and
wherein the outer side wall includes a first portion having a thickness greater than a thickness of the inner side wall, and the coupling portion is disposed within the first portion of the outer side wall.

12. The motor of claim 11, wherein the pair of parts of each of the insulators comprise:
an upper insulator that surrounds an upper portion of an outer circumferential surface of the tooth; and
a lower insulator that is connected to the upper insulator and that surrounds a lower portion of the outer circumferential surface of the tooth.

13. The motor of claim 12, wherein the lower insulator comprises an extension wall that extends upward from a top portion of the lower insulator, and
wherein the upper insulator comprises a step portion that extends downward from a bottom portion of the upper insulator and that mates with the extension wall.

14. The motor of claim 13, wherein the extension wall defines an inner surface of the insulator that faces the tooth.

15. The motor of claim 11, wherein the outer side wall defines the coupling portion at an interface between the pair of parts of each of the insulators.

16. The motor of claim 11, wherein each of the insulators defines a curved groove disposed at an outer portion of the insulator that faces an inner circumferential surface of the stator core, the curved groove being configured to receive the coil drawn out from the insulator.

17. The motor of claim 16, further comprising:
at least one 3-phases power lead wire that is drawn toward the inner circumferential surface of the stator core through the curved groove,
wherein the coil is wound around one of the insulators and connected to the at least one 3 phases power lead wire.

18. The motor of claim 11, wherein the outer side wall further includes a second portion having a thickness less than the thickness of the first portion of the outer side wall.

19. The motor of claim 11, wherein the thickness of the first portion of the outer side wall defines a maximum thickness of each of the insulators, and the thickness of the inner side wall defines a minimum thickness of each of the insulators.

20. The motor of claim 11, wherein the coupling portion comprises a protrusion that has a cylindrical shape and a groove that receives the protrusion.

* * * * *